UNITED STATES PATENT OFFICE.

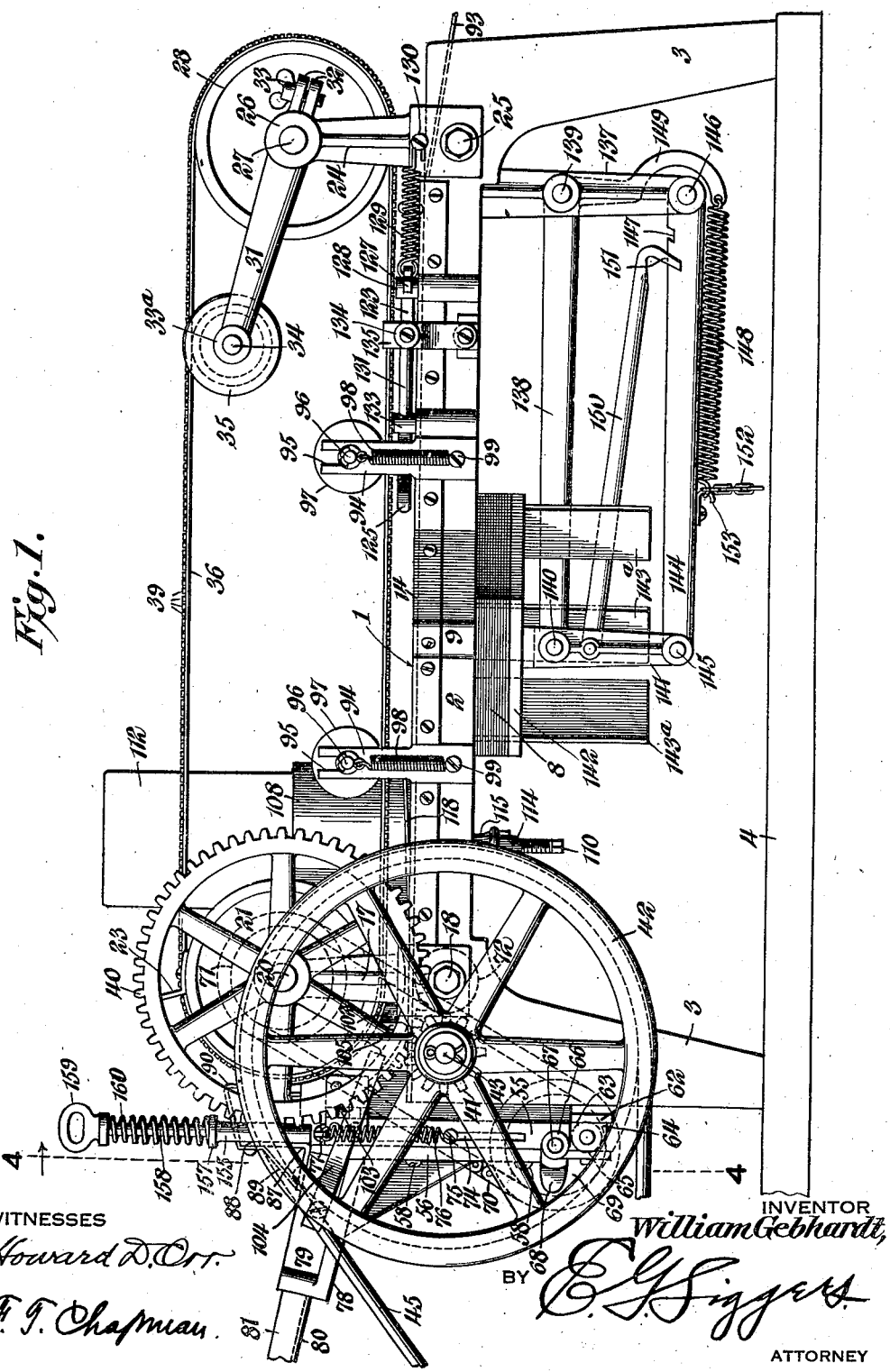

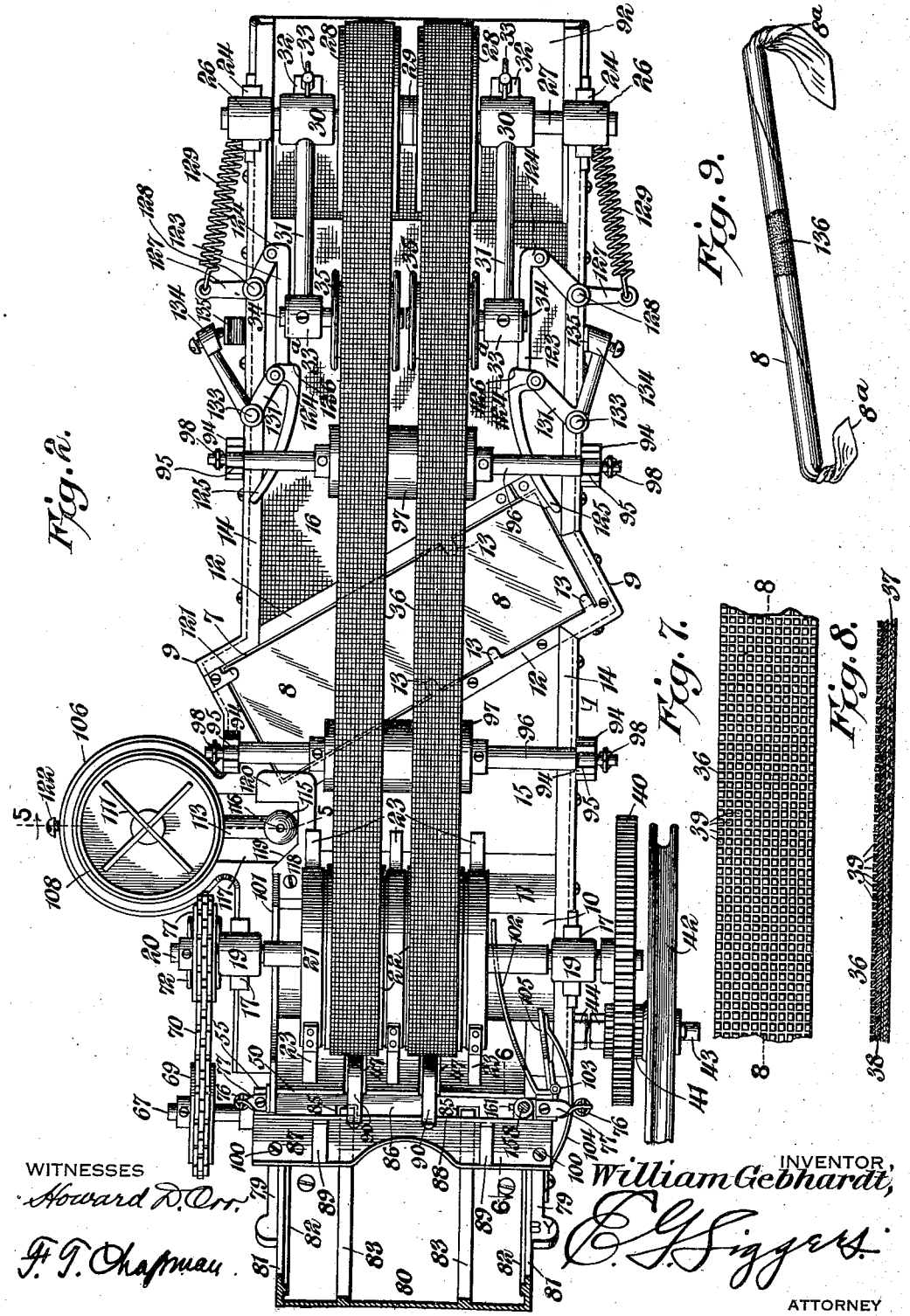

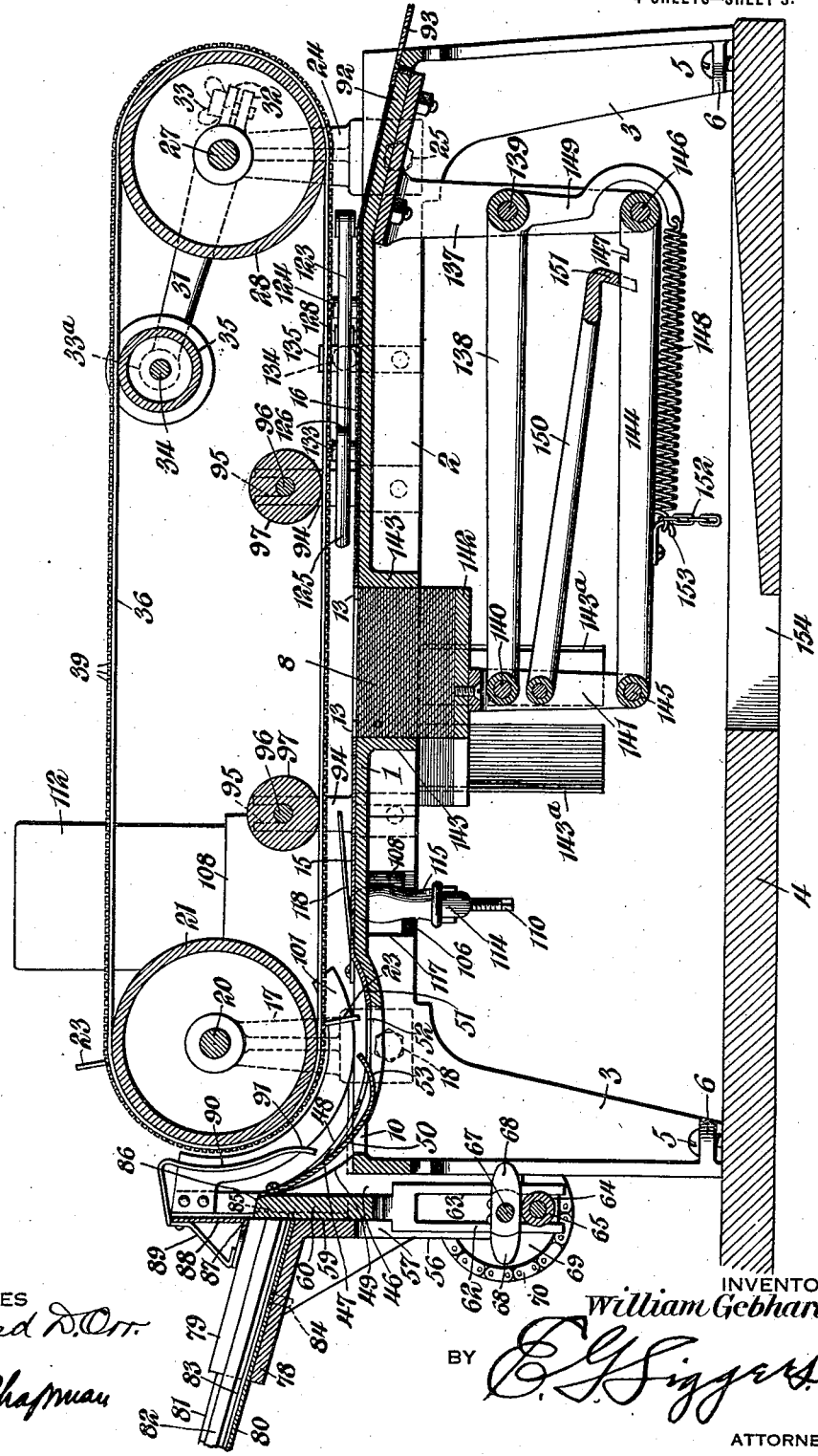

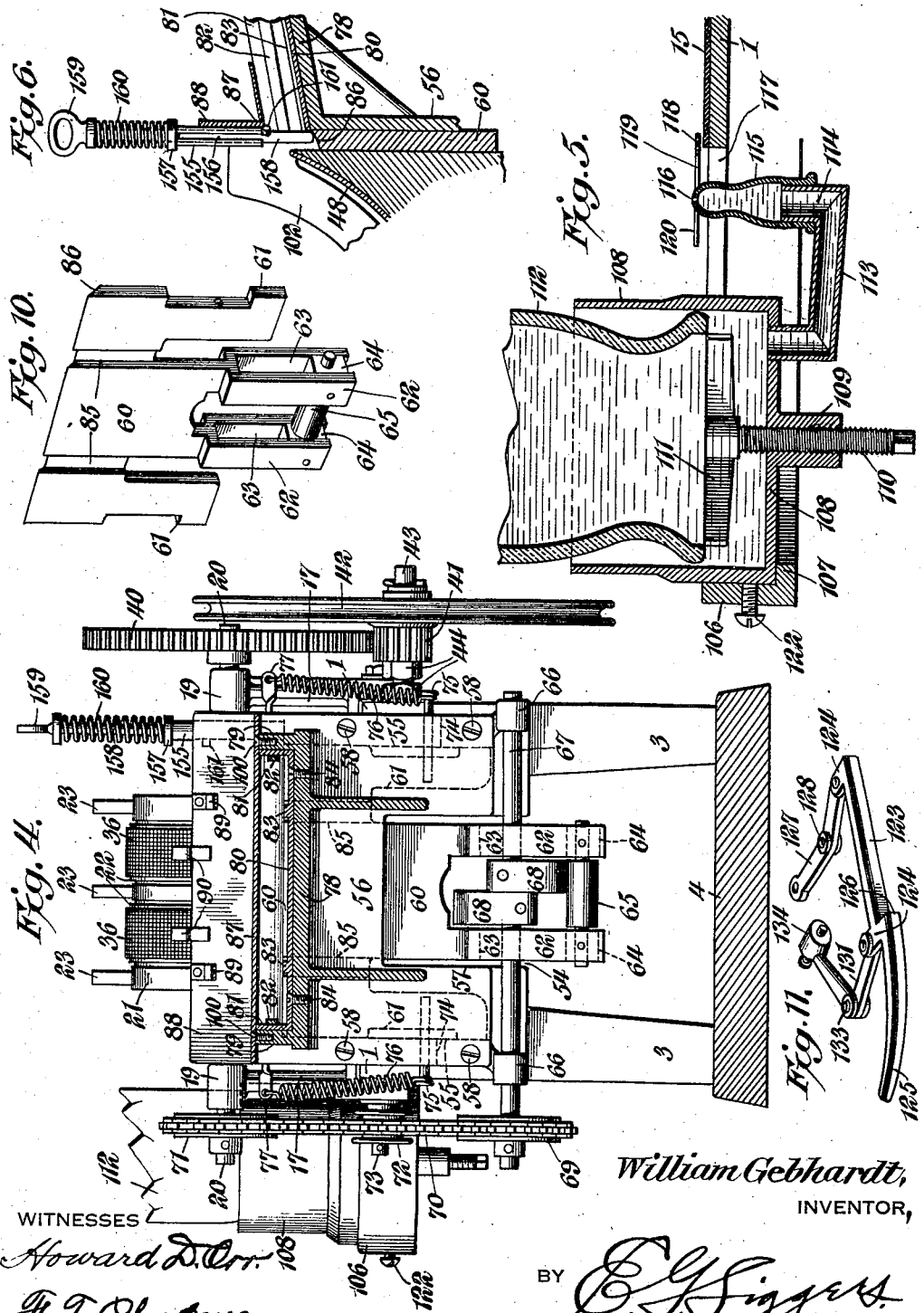

WILLIAM GEBHARDT, OF SAN ANTONIO, TEXAS.

CANDY-WRAPPING MACHINE.

1,185,496.  Specification of Letters Patent.  Patented May 30, 1916.

Application filed June 7, 1915. Serial No. 32,643.

*To all whom it may concern:*

Be it known that I, WILLIAM GEBHARDT, a citizen of the United States, residing at San Antonio, in the county of Bexar and State of Texas, have invented a new and useful Candy-Wrapping Machine, of which the following is a specification.

This invention has reference to candy wrapping machines, and its object is to provide a machine whereby candy, and especially stick candy, may be expeditiously wrapped, so that each stick of candy has a wrapper individual thereto.

This invention is an improvement upon the candy wrapping machine shown and described in my application No. 852,939, filed July 24, 1914, wherein the sticks of candy are caused to travel successively through the machine, and the arrangement is such that each stick receives near one end a small drop of adhesive, usually a syrup of the same character as the sticks of candy. Each stick of candy after receiving the small drop of adhesive is rolled over a wrapper, usually of paraffin paper, in such manner that the paper is caused to adhere to the stick by the adhesive, so as to be picked up or lifted away from underlying wrappers, since the wrappers are contained in a reservoir and have a constant tendency to move into the path of the sticks in their travel through the machine. For this reason the small drop of adhesive may be termed an adhesive pick-up. The stick is caused to roll over the wrapper to which it is attached, whereby the wrapper encircles the stick in the form of a long helix and subsequently the ends of the wrapper encircling the stick are brought into contact with twisting fingers whereby the ends of the wrapper where projecting beyond the ends of the stick are suitably twisted to maintain the wrapper upon the stick. Finally the wrapped stock is discharged from the machine.

The machine described in the aforesaid application is designed to work with elongated rectangular wrappers of a kind readily obtainable upon the market, so that the expense of special wrappers or special machinery for producing the wrappers is avoided. Such rectangular wrappers are located in the path of the oncoming sticks, so as to be engaged by the stick at or close to one corner.

The present invention contemplates numerous improvements upon the machine of the aforesaid application, whereby its operation is greatly improved, and these improvements include improved feeding mechanism, an improved means for directing the adhesive into the path of the sticks, and for holding those portions of the wrappers first engaged by the sticks in position to be so engaged, improved twisting means, improved means for maintaining a pile of wrappers in proper position, and improved means for causing the sticks to travel through the machine, as well as other features which will hereinafter appear.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation of the candy wrapping machine of the present invention. Fig. 2 is a plan view thereof. Fig. 3 is a longitudinal vertical section. Fig. 4 is a section on the line 4—4 of Fig. 1. Fig. 5 is a section on the line 5—5 of Fig. 2 but drawn on a larger scale. Fig. 6 is a section on the line 6—6 of Fig. 2 but drawn on a larger scale. Fig. 7 is a plan view of a small portion of one of the feed belts. Fig. 8 is a section on the line 8—8 of Fig. 7. Fig. 9 is a perspective view of a wrapped stick of candy. Fig. 10 is a perspective view of the candy elevating slide. Fig. 11 is a perspective view of one of the wrapper-twisting devices.

The machine of the present invention is primarily intended for wrapping candy in the form of elongated sticks, which candy is commercially known as stick candy, but there are features of the invention which are adaptable for applying wrappers to other cylindrical bodies, wherefore the invention is not confined in its usefulness to stick candy. However, for simplicity of description the expressions "stick candy" or "candy sticks" will be employed hereinafter and in the claims as including both the commercial article known as stick candy and other articles of like shape.

Referring to the drawings, there is shown a table 1 of generally elongated rectangular shape with marginal outwardly directed webs 2 and supporting legs 3, the latter being at the corners of the table, and usually cast in one piece therewith. The making of the table with its supporting legs in one casting is quite feasible, since in the practical embodiment of the invention the table need not exceed and may even be less than two feet in length by about seven or eight inches in breadth, and the table may stand between six and seven inches high.

Since it may be desirable because of the small size of the entire machine to have it readily transportable from place to place as convenience may dictate, there is provided an elongated supporting base 4 of wood or metal to which the legs 3 are made fast by screws 5 or otherwise, said legs at their lower ends being formed with ears 6 for the passage of the screws 5.

The base 4 may be of sufficient length to support a small electric motor in addition to the table, which motor constitutes a convenient means for driving the machine, but as motor drives are very common, it is not deemed necessary to show the motor.

Extending diagonally across the table about mid-way of its length is a cut-out 7 of elongated rectangular outline designed to receive a pile of wrapping sheets 8 for the candy sticks. These sheets may be of the kind readily obtainable upon the market, and are usually composed of paraffin paper, although, of course, any suitable wrapping sheet may be employed. To provide for the diagonal arrangement of the cut-out 7 with respect to the longitudinal center line of the table, the side walls of the table represented by the flange 2 are out-set, as indicated at 9, wherefore wrappers of a suitable size are accommodated without necessitating an increase in the width of the table.

At one end of the table there is a cut-out 10 extending crosswise of the table in substantially perpendicular relation to the longitudinal center line of the table, and along one edge of this cut-out the table has a depressed portion 11 also extending crosswise thereof.

Extending about the diagonal cut-out 8 are margin or border strips 12 having tongues 13 formed thereon at appropriate points. These tongues encroach on to the space defined by the cut-out 7 for a short distance to constitute stops for the pile of wrappers 8, this pile of wrappers being urged into engagement with the stops 13 by means to be described. The sides of the table are provided with border strips 14 which are continued about the offsets 9 of the sides of the table, and these border strips may be employed for holding some structures to be described.

The upper surface of the table between the cut-outs 7 and 10 is in most part provided with a covering 15 which may consist of a sheet or sheets of rubber or rubber fabric. That portion of the top of the table on the other side of the cut-out 7 is provided with a cover 16, which, however, may be of a different character from the cover 15, because of certain conditions to which it is subjected, which conditions are hereinafter referred to. Since the cover 16 which is made of rubber or rubber fabric is of the same general construction as certain other parts of the machine, the peculiarities of this cover will be found described in conjunction with the description of certain feed belts hereinafter referred to.

Secured to the sides of the table 1 at opposite ends of the cut-out 10 and exterior to the table are posts 17, the securing means in the particular showing of the drawings being screws 18, but, of course, other means for securing the posts may be provided, or these posts may even be cast in one piece with the table. These, however, are matters of structural detail which do not affect the invention.

The posts 17 rise from above the top of the table and terminate in journal bearings 19 carrying a shaft 20 extending transversely of the table. This shaft has fast to it at an appropriate point a cylindrical drum 21 having upon its exterior surface two spaced broad ridges 22. On opposite sides and between these ridges the drum carries diametrically opposite radially outstanding fingers 23 each provided with a basic portion by means of which it is secured to the drum. Of course, the fingers 23 may be otherwise secured to the drum, and instead of being flat fingers, as shown, they may be otherwise shaped so long as they perform the function hereinafter ascribed to them.

Near that end of the machine distant from the posts 17 are other similar posts 24 secured to the table 1 on the exterior thereof at opposite sides by screws or bolts 25 similar to the screws or bolts 18. Each post 24 rises above the top of the table and terminates at its upper end in a journal bearing 26. Journaled in the bearings 26 are the ends of a shaft 27, which between its ends carries pulleys or drums 28 appropriately spaced apart by a spacing washer 29 mounted on the shaft 27. The pulleys 28 turn loosely on the shaft which may fit so tightly in the bearings 26 on the posts 24 as to be held from turning thereby, or any other means may be provided for preventing the shaft 27 from turning. Mounted on the shaft 27 between each pulley 28 and the neighboring post 24 is a split sleeve 30 carrying an arm 31 projecting radially therefrom and also provided with ears 32 traversed by a wing screw 33 so that the sleeve 30 may be clamped to the shaft 27 in any position of adjustment thereabout. That end of each arm 31 remote from the sleeve 30 carrying it is formed into a head 33ª from which projects a stud 34 toward the like stud carried by the other head 33. These studs are in line one with the other and in parallel relation to the shaft 27 and each carries a flanged roller 35.

Extending about the ribbed portions 22 on the drum 21 and also about the pulleys 28 and engaged by the flanged rollers 35, are two endless webs or belts 36 spaced apart one from the other in agreement with the spacing of the ribs 22 and pulleys 28, which ribs and pulleys are crowned to maintain the parallelism of the webs or belts 36 when these belts are caused to travel by the rotation of the drum 21 in a manner and for a purpose to be described.

The webs or belts 36 are each made of a basic portion 37 which may consist of canvas or the like, and a layer 38 of rubber having its outer surface longitudinally and laterally grooved to form a multitude of small projections 39 preferably of square outline, but not necessarily so.

Considering stick candy as the material to be wrapped and paraffin paper as constituting the wrappers 8, certain conditions have been found to exist which are detrimental to the proper operation of various types of belts 36 and it became necessary to devise a special belt construction to meet these conditions. The covering or surfacing 16 of the table 1 has to meet the same conditions and therefore is made of the same fabric as the belts 36.

As will hereinafter appear, the candy sticks after being inclosed by the wrappers are carried by the belts 36 along the surface 16 for further treatment of the wrapper, and there is a liability of the paraffin so affecting the surfaces referred to that unless especial provision be made these surfaces soon become covered with paraffin in a manner to make them slippery and useless. This difficulty has been overcome by providing the projections 39 by the scorings in the surface of the belts and the covering 16.

The drum 21 is rotated by the shaft 20 to which power is applied through a gear wheel 40 applied to the shaft 20 where it projects from the corresponding side of the table 1. The gear wheel 40 is in mesh with the pinion 41 fast to a pulley 42, and this pinion and pulley are together mounted on a stud 43 projecting from the corresponding side of the table 1. For convenience of adjustment the stud 43 is mounted eccentrically in the table 1 and is held in place by lock nuts 44, so that by turning the stud the pinion 41 and gear wheel 40 are brought into proper mesh. The pulley 42 which may be a grooved pulley is designed to be operated by a belt 45 from an electric motor already referred to as mounted on the base 4, but which for lack of space on the drawings is not shown.

Secured to that end of the table adjacent to the opening 10 through the table, and which end of the table may be termed the feed or receiving end, there is an upright plate-like block 46 having near its upper end a shouldered projection 47 resting on top of the table and provided with a concave breast 48 directed toward and spaced from the drum 21 and concentric therewith. The projection 47 is provided with recesses or slots 49 spaced apart and located opposite to the flattened ridges 22 on the drum 21. Secured in each recess 49 is a spring tongue 50 made fast at one end near the top of the respective recess, and then continued in a downward direction toward the other end of the table, being sufficiently housed in the recess to be out of the path of any object moving along the breast 48.

Secured to the depressed portion 11 of the table top 1 and conforming to the shape of such depression is a plate 51 having slots 52 therethrough corresponding in position to and in line with the recesses 49. The tongues 50 underride that edge of the plate 51 toward the block 46, and have curved extremities 53 rising through the slots 52 into the path of an object moving along the breast 48.

The block 46 below the level of the top of the table 1 is formed with a slot 54 midway of its width, and at the sides the block is formed with upright flanges 55 extending from the surface of the block in a direction away from the table 1.

Applied to the flanges 55 is an angle plate 56 having a slot or recess 57 corresponding to the slot 54. This plate is made fast to the block 46 by screws 58 entering the flange 55, or the parts may be secured together in any other appropriate manner. The flanges 55 offset the plate 56 from the block 46, so that there is produced a chamber or receptacle 59 between them. Lodged in this chamber is a slide 60 having guide members 61 at the sides movable along the corresponding parts of the flanges 55, while midway between these guides the slide 57 is formed with laterally spaced pendent arms 62, each of which has a bifurcated terminal portion 63. At the extremity of each arm 62 there is secured a block 64 and extending between these blocks and journaled therein is a roller 65.

The lower ends of the flanges 55 are formed into journal bearings 66 traversed by a shaft 67 provided between the arm 62 with oppositely directed cams 68 in position to alternately engage the roller 65. The shaft 67 is prolonged beyond one of the journal bearings 66 and there carries a sprocket wheel 69 connected by a sprocket chain 70 to another sprocket wheel 71 fast on a prolongation of the shaft 20. A small flanged idler roller 72 mounted on a stud 73 projecting from the corresponding side of the table 1, serves to hold the sprocket chain sufficiently tight to prevent undue rattling.

Each flange 55 is longitudinally slotted as shown at 74, and extending through each slot is a pin 75 carried by a corresponding one of the guides 61, so as to participate in movements of the slide 60. Each pin 75 receives one end of a corresponding spring 76, the other end of this spring being made fast to a bracket 77 fast to the upper end of the corresponding flange 55.

The springs 76 are of sufficient strength and under such tension as to constantly maintain the slide in the uppermost position with the roller 65 in engagement with one or the other of the cams 68. The springs yield to the action of the cams 68 which engage the roller 65 and depress the slide, but as soon as the cams release the slide the latter rises under the action of the springs 76.

The chamber or receptacle 59 is open at the upper edge and the slide 60 is of sufficient length to project through such open top of the chamber until in its uppermost position it reaches to or above the block 46. The cams 68 are long enough to cause a lowering of the slide until its upper edge is below the top of the plate 56.

The plate 56 has a web extension 78 projecting away from the table 1 at an obtuse angle to the plate 56. The ends of the webs 78 are formed with upstanding flanges 79. Fast to the top of the web 78 is an elongated chute 80 which may be in the form of a relatively flat plate with upturned longitudinal margins 81 having elongated strips 82 on their inner faces, while lengthwise of the chute are ribs 83 spaced apart less than the length of the shortest stick of candy for which the machine is designed. One end of the chute 80 constitutes its lower end, since it is inclined similar to the inclination of the web 78 due to the obtuse angle that its web makes with the upright plate 56. The plate 80 extends to the lower end of the web 78, while the flanges 81 stop short at the flanges 79 against which they may abut. The plate 80 is secured to the web 78 by screws 84 or otherwise and the strips 82 extend along the inner faces of the flanges 79 to the lower ends of these flanges. Where the strips 82 extend along the flanges 79 they may be free from connection therewith and yieldably approaching so as to engage the ends of sticks of candy and prevent these sticks from escaping from the supporting ribs 83, which ribs project a short distance beyond the lower end of the plate 80 and into recesses 85 formed in the corresponding face of the slide 60. The upper edge of this slide is beveled or inclined, as shown at 86, which inclination is sufficient to cause any cylindrical object resting upon the edge 86 to roll off therefrom, and when this edge 86 is as high as the top of the block 46 any object supported by the slide will then gravitate on to the curved breast 48 and roll along the latter toward the ends 53 of the fingers 50.

Mounted on and extending between the flanges 79 at the lower ends of these flanges is an angle strip 87 having an upstanding web 88 connected to the body of the plate 87 by stiffening braces 89. Fast to the upper end of the web 88 are two curved spring fingers 90 so positioned as to extend between the web 88 and the drum 21 close to the latter, while the lower ends of these fingers which are slightly curved toward the breast 48, enter or closely approach the recesses 49. These curved lower ends of the fingers 90 are indicated at 91, and are closer to the breast 48 than the thickness of a stick of candy.

If it be assumed that the slide 60 is in its uppermost position, sticks of candy may be placed in the chute and will gravitate therealong until further progress is arrested by engagement of the lowermost stick with the corresponding face of the slide, the upper end of which latter rises above the lower end of the chute. If, now, the machine be started, one or the other of the cams 68 by engaging the roller 65 causes a depression of the slide 60 until its beveled upper edge 86 is below the level of the lower end of the chute, whereupon the sticks of candy gravitate farther along the chute until the lowermost one is arrested by engagement with the wall of the block 46 where projecting above the table and above the lower end of the chute. This brings the lowermost stick of candy in the chute directly over the beveled upper end 86 of the slide. Assuming that the machine is running the cam 68 which caused the lowering of the slide moves away from the roller 65, so that the springs 76 lift the slide, thus engaging and lifting the lowermost one of the series of sticks of candy then in the chute, but the thickness of the slide is such that the next higher stick of candy is not engaged by the slide. If the stick of candy engaged by the slide be thicker than the slide, then the next higher stick on the movement of the lowermost stick out of the way, gravitates along the slide, and the rest of the sticks follow it. The stick of candy engaged by the edge 86 of the slide is lifted until it is above the upper edge of the shouldered portion 47 of the block 46, whereupon the stick of candy rolls down the beveled edge 86 toward the breast or drop-away part 48, upon which it falls and rolls or slides along this curved breast until caught by the end 91 of the fingers 90 and there it remains for a time until by a continued rotation of the drum 21 one set of fingers 23 thereon comes into contact with the candy stick to propel it farther along its course. By providing three fingers 23 in each series they are arranged on opposite sides and between the spring fingers 90 and without injury to the candy stick move the latter beyond the ends 91 of the fingers 90, the latter yielding to the force applied. The stick is now free to gravitate farther along the breast 48 which it does until its movement is arrested by the upturned ends 53 of the fingers 50. The stick remains in this position until the fingers 23 which carried it away from the spring fingers 90 again engage the stick, but by this time it is upon the plate 52, which is nearly level and only rises slightly to reach a higher point of the table 1 where provided with a covering 15, after which the candy stick is engaged by the belts 36 and rolled to the other or discharge end of the machine, where the table 1 beneath the pulleys 28 has a downwardly inclined portion 92 permitting the candy stick to be released from engagement with the belts 36, and because of the declination of the table extremity 92 the candy sticks will roll therealong and ultimately upon discharge fingers 93 carried by the discharge end of the table, these fingers serving to support the candy stick until it reaches a receptacle, which latter is not shown in the drawing.

In order to hold the belts 36 in engagement with the candy stick while being rolled and propelled along the table, posts 94 are erected at appropriate points on opposite sides of the table. These posts have recesses 95 at their upper ends forming journal bearings for the corresponding ends of spindles 96 each carrying a roller 97 overriding the belts 36 and holding them yieldingly against candy sticks then in engagement with the table to apply sufficient friction to the candy sticks to roll them along the table without liability of diverging from their proper course. To the outer ends of each spindle 96 springs 98 are connected, these springs being also connected to screws 99 projecting from the lower ends of the posts 94. The purpose of these springs is to supplement the weight of the rollers 97 in maintaining the belts 36 in proper engagement with the candy sticks rolling along the table top.

The plate 87 may be secured to the flanges 79 by screws 100, or in any other appropriate manner.

Projecting from and carried by one side portion of the block 46 is a guide plate 101 which may be curved in conformity with the space between the drum 21 and the breast 48, and this strip 101 constitutes a relatively fixed abutment for the corresponding end of a candy stick. The other end of the stick is under the control of a relatively elastic finger 102 provided with a hinge support 103 on the end of the block 46 remote from the guide strip 101 and urged toward the drum 21 by a spring 104 made fast to the plate 56 and engaging an extension 105 from the hinge 103. The purpose of the elastic and yieldable guide 102 is to force sticks of candy in the direction of their length against the guide 101, so that all sticks, long or short, have the ends engaging the guide 101 all in the same position with relation to certain other parts.

On that side of the table 1 where the forward end of the diagonal passage 7 is located and between such forward end and the feed end of the machine, the table is formed with a lateral offset 106 which in the particular showing of the drawings is of circular outline. This lateral offset includes a corresponding portion of the flange 2 and is provided with a sunken ledge 107 serving to support a cup 108 rising an appropriate distance above the top of the table. This cup is provided with a depending boss 109 axially screw threaded for the passage of a screw threaded stem 110 carrying at its upper end a spider 111 designed to receive the mouth end of a bottle 112 intended for the reception of a liquid. A pipe 113 is connected to the bottom of the cup 108 and drops therefrom, and then is carried a distance from the cup and terminates in an upstanding nipple 114 to which is applied an elongated flexible cap 115 provided at its upper end with a passage 116 of small area. Where the table 1 is provided with an offset 106 it also has an entering recess 117 communicating with the interior of the offset 116, and this recess is of sufficient length crosswise of the table to provide for the passage of the cap 115. Fast at one end to the table 1 is an elastic plate 118 projecting across the inner end of the recess 117 and in turn provided with a recess 119 of sufficient size to receive the perforated upper end of the cap 115 and permit some degree of adjustment of this cap lengthwise of the table about the axis of the circular offset 106. The plate 118 has a free end 120 in overriding relation to the forward end of the diagonal passage 7 and consequently to the corresponding end of the pile of wrappers 8, thus serving as a yieldable retaining means for such end of the pile of wrappers. The neighboring corner of the pile of wrappers is temporarily retained by a short tongue 121 formed on the strip 9 where adjacent to said corner.

The liquid contained in the bottle 112 is customarily a syrup made from broken stick candy or may be a syrup made from the same material from which the candy sticks are manufactured but without utilizing the broken sticks for the purpose. In either event the material in the bottle is of the same character as of the candy sticks, or may be of any other material closely approaching the material from which the sticks are made. By inverting the bottle and supporting it on the spider 111 and properly adjusting the height of said spider, the syrup flows out of the bottle into the cup 108 to a level which will cause the syrup to rise in the cap 115 to or nearly to the opening 116. With the parts all properly adjusted the candy stick on rolling over the cap 115 causes the syrup therein to flow out in quantity just sufficient to deposit on the stick a minute drop which would readily adhere to the stick and by placing the nipple 115 at an appropriate distance from the forward corners of the wrappers 8, this minute drop or pick-up of adhesive engages the topmost wrapper of the pile close to the corner, and adhering thereto causes the wrapper to begin to wind about the stick, this winding continuing with certainty as soon as the corner of the wrapper has made one turn about the stick. The wrapping then continues progressively lengthwise of the stick until the stick is traveled entirely over the wrapper pile, and thence moves toward the discharge end of the table.

In order to hold the cup 107 in adjusted positions a set screw 122 is threaded through the offset 106 at an appropriate point to bind the cup in place.

Having wound the wrapper about the stick it is made to maintain its position thereon by twisting the ends of the wrapper where they project beyond the ends of the stick, the wrapper being sufficiently long for the purpose. This operation is performed by twisting mechanism which in the main may be quite similar to the twisting mechanism for a like purpose disclosed in the aforesaid application.

The twisting mechanism comprises elongated fingers 123 provided at spaced points along their length with ears 124, one set of ears being at one end of the finger and the other set about midway of the finger. Extending toward the receiving end of the machine from the second-named set of ears are curved prolongations 125 of the fingers, these prolongations having the curvature directly toward the side of the table so that the fingers are spaced apart a greater distance at the free ends of the prolongations than at those ends joining the body of the fingers. At the last-named point the prolongations are offset toward each other from the bodies of the fingers forming shoulders 126.

Each finger has one pair of ears 124 connected to one end of an angle rock arm 127 mounted upon an upright pivot pin 128 rising from the table 1 and carrying the arm 127 about midway of its length. The other end of the arm is connected to one end of a spring 129 having its other end connected to a fixed part of the machine, as, for instance, to a stud or screw 130 carried by the corresponding post 24.

That pair of ears 124 adjacent to the shoulder 126 is connected to one end of an angle rock arm 131 mounted at its angle on a stud 133 rising from the table 1, while the other end of this rock arm is formed into a head 134 shaped to engage the free end of a leaf spring 135 fast to and rising from one edge of the table. The two angle arms 127 and 131 constrain the folding fingers 123 to move toward and from each other, while maintaining a parallel relation one to the other, but moving away one from the other upon arcs determined by the pivot pins 128 and 133 in a direction toward the discharge end of the table. The springs 129 return the arms to their position of close approach, while the springs 135 act as elastic buffers avoiding shocks and noise.

When the candy stick with its wrapper approaches the forward divergent ends of the twisting fingers, the candy stick continues its rolling progress through the machine, while the ends of the wrapper where engaged by the fingers are retarded sufficiently to impart to them a twisting movement which becomes more and more pronounced as the curved ends of the fingers approach, and these fingers yield more or less to the progress of the candy stick. The result is that the projecting ends of the wrapper are twisted and folded back upon the candy stick until the wrapped stick appears similar to the showing of Fig. 9, where the wrapper is indicated at 8, the candy stick is indicated at 136, and the twisted and folded ends of the wrapper are indicated at $8^a$. Having passed the folding fingers the wrapped stick quickly reaches the discharge end of the machine and escapes therefrom. The shoulders 126 in bringing the curved wrapping ends of the wrapping fingers closer together than the bodies of the wrapping fingers prevents drag of the twisted ends of the wrapper upon the fingers after the wrapping is finished, so that there is no liability of sluing the sticks after being wrapped and before reaching the discharge end of the machine.

Fast to and depending from the under side of the table near the discharge end is a fixed duplex arm 137 having the sides in substantial parallelism and mounted on the arm between its side members at a point intermediate of the length of the arm is an angle lever 138 carried by a pivot pin 139. This lever extends toward the receiving end of the machine and is there connected by a pivot pin 140 to a duplex or bifurcated arm 141 depending from a plate 142 constituting a follower carrying the pile of wrappers 8. Surrounding the opening 7 are depending flanges 143 from which in turn depend guide strips 143ª serving to position the pile of wrappers on the follower 142. In order to maintain the follower 142 substantially level the lower end of the arms 137 and 141 are connected by a link 144 pivoted at one end to the arm 141 by a pivot pin 145, and at the other end to the lower end of the arm 137 by a pivot pin 146. Moreover, the arm 144 near the pin 146 is formed with a notch 147 in its upper edge, and is furthermore connected by a spring 148 to the free end of an arm 149 constituting one member of the angle arm 138, the arm 149 being appropriately bent to avoid contact with the end of the arm 144 carried by the pivot 146. Pivoted at the forward end to the arm 141 is a latch link 150 which at the end remote from its pivot is formed into a bifurcated angle extension 151 adapted to straddle the corresponding portion of the link 144 and to enter the notch 147.

In order to vary the tension of the spring 148 the end attached to the arm 144 is provided with a short section 152 of chain and the arm 144 has a hook 153 fast thereto. By this means, which may be taken as indicative of any suitable means for the purpose, the tension of the spring 148 may be varied as desired. In order to provide for the rise and fall of the parts carrying the follower 142, the base 4 is cut away, as shown at 154.

While the operation of the machine has already been described in part in connection with the description of certain of the mechanism, it may be here briefly outlined as follows: The candy sticks fed down the chute 80 are lifted one by one by the rising of the slide 60 and allowed to fall over the upper edge of the angle extension 49 of the block 46. These sticks as thus discharged from the chute are each first caught by the ends 91 of the fingers 90 and then moved therefrom by the fingers 23 on the drum 21 as the latter is rotated, and while the sticks are then temporarily arrested in their progress through the machine by the curved ends 53 of the fingers 50 they are ultimately carried to a point on the table where they move on to the cover 15 and are engaged by the under run of the then moving belts 36. This causes a progressive rolling of the sticks so that one end of each stick is carried over the perforated end of the cap 115 to thereby receive a small drop of syrup and this means for causing an adhesive pick-up to be applied to the candy stick is so related to the forward end of the pile of wrappers 8 that a complete rotation of the stick about its longitudinal axis brings the pick-up into engagement with the uppermost wrapper 8 of the pile just beyond the end 120 of the plate 118. The wrapper is thereby caused to adhere to the stick and begins to be rolled about the stick by the progressive movement of the stick to the machine, the wrapping beginning at one corner of the wrapper and progressing toward the other corner of the wrapper, so that when wholly applied to the stick it extends around the latter in a helical direction of long pitch with the wrapper projecting beyond the opposite ends of the stick. Further progressive rolling of the stick through the machine brings the projecting ends of the wrapper into engagement with the curved portions 125 of the wrapping fingers 123, and these fingers lying close to but slightly above the cover 16 of the table direct the ends of the wrapper over the fingers, which at the same time press the wrapper extremities toward the ends of the stick, thus causing the twisting and folding of these wrappers at the ends. After this the sticks are carried to the discharge end of the machine and allowed to gravitate therefrom.

When the pile of wrappers 8 is placed on the follower 142, the latter is first pressed down. This causes a rocking of the lever 138 and its angle continuation 149 in a manner to extend the spring 148, while at the same time the arm 144 and the arm 141 move into the cut away portion 154. This causes the arm or link 150 to move along the arm 144 until its angle end 151 drops into the notch 147, thus locking the follower in the depressed position. An operator may now conveniently lodge a pile of wrappers 8 upon the follower 142, after which the latch arm or link 150 is raised out of the notch 147 and the follower is released to the action of the spring 148 which tends to rock the lever 138 in a direction to lift the follower and this action continues until the topmost wrapper 8 is caught by the stop fingers 13, 120 and 121. As each wrapper 8 is moved from the pile, the spring 148 brings the next wrapper in order against the stop fingers, thus holding the pile of wrappers with the topmost one always in the path of a candy stick traveling through the machine. The feed of the wrappers which is only that of the thickness of a wrapper for each stick, is in a direction substantially perpendicular to the direction of travel of the sticks through the machine and the wrappers are arranged diagonally to the line of travel of the sticks, and also to the length of the sticks with one corner approximately in the path of that portion of the stick to which the adhesive pick-up is applied.

The spring plate 118 gives somewhat to the pressure exerted thereupon by the rolling stick so as to bring the stick into engagement with the cap 115 and slightly press it to thereby cause a small drop of syrup to exude therefrom and become attached to the stick. This plate where overlying the forward corner of the pile of wrappers is pressed down into firmer contact therewith as the stick rolls along over the plate and then as the stick leaves the free end 120 of the plate it yields sufficiently to loosen the forward corner of the topmost wrapper, thus permitting it to readily withdraw from under the plate to adhere to the stick because of the presence of the adhesive pick-up and the wrapper is thereby readily and certainly wound about the stick.

The machine of the present invention is well adapted to take care of sticks of various lengths, and of all the standard lengths, since the wrappers may be all of one length or nearly so, and are such as may be bought upon the market already prepared, thus avoiding the necessity of any special machinery for the purpose.

The end stop member 101 being a fixed member determines the position of the corresponding ends of the candy sticks irrespective of the length of the latter and the folding finger 123 on the corresponding side of the table may have a fixed limit of approach toward the longitudinal center line of the table. This limit is determined by the position of the buffer spring 135 which may be suitably offset from the side of the table 1, while the folding finger 123 on the other side of the table may have a limit of approach toward the center line closer to the latter than the first-named finger 123. This automatically accommodates the machine to twisting the ends of the wrappers for candy sticks of various lengths without the necessity of any special adjustments. For short sticks the wrappers will project to a somewhat greater extent from one end of the stick than from the other, while for longer sticks the projection of the wrappers is more nearly equal. If the sticks be of increased diameter over that for which the machine may be at the time set, the cap 115 may be moved to a greater distance from the pile of wrappers than before, and this is accomplished by loosening the screw 122 and rotating the cup 108 for a correspondingly small fractional portion of a revolution. Such adjustment is permitted by the cut-out 119 in the plate 118, as well as by the width of the recess 117, which is made ample for the purpose. It is usually not necessary to laterally adjust the belts 36 or the parts carrying them, so such adjustment while possible need not be considered. The spring stop 102 always has the tendency to push the sticks whatever be their length into end engagement with the fixed stop 101.

During the operation of the machine it is sometimes either necessary or advisable to stop the feed, and in order to permit such stopping of the feed of the candy sticks without the necessity of stopping the machine as a whole, there is secured to the upright web 88 of the plate 87 a sleeve 155 which is located at one side of the chute out of line with the candy sticks, but so as to override the corresponding end of the slide 60. This sleeve is upright and along one long side has a longitudinal slot 156 while the upper end of the sleeve is prevented from spreading by a collar 157. Extending lengthwise through the sleeve is a pin 158 considerably longer than the sleeve and provided at its upper end with a finger-hold or handle 159. Between this finger-hold and the collar 157 the pin 158 is surrounded by a spring 160 and projecting laterally from the pin near its lower end is a stud 161.

Under normal conditions the stud 161 is located in the slot 156 and the pin is held in an elevated position by the spring 160, the lower end of the pin being then out of the path of the slide 60. When it is desired to stop movement of the slide 60 the pin 158 is moved against the action of the spring 160 until the stud 161 is below the lower end of the sleeve 155, and then by turning the pin so that the stud 160 underrides the lower end of the sleeve 155 the pin becomes locked in the depressed position with the lower end of the pin in the path of the slide 60 so that it cannot then rise above the level of the bottom of the lower end of the chute 80. The other moving parts of the machine may continue in motion, but the slide 60 is then so held that it cannot be acted upon by the springs 76 and is out of the path of the cams 68, wherefore the feed of the candy sticks stops.

What is claimed is:—

1. In a machine for wrapping stick candy and other articles, an inclined feed chute for the candy sticks closed at the lower end against the spontaneous escape of the sticks, a reciprocable slide at the lower end of the chute for engaging the sticks and lifting them over the closed end of the chute, a guiding breast dropping away from the discharge end of the chute to receive the sticks therefrom, a rotatable stick propelling means associated with the curved breast and located on the side thereof remote from the chute to propel the candy sticks away from the chute, stick propelling means for receiving the sticks after leaving the curved breast to cause them to roll progressively through the machine, and means in the path of the rolling sticks for applying wrappers thereto and for twisting the ends of the wrappers.

2. In a machine for wrapping stick candy, an inclined feed chute closed at the lower end against spontaneous escape of sticks from the chute, stick elevating means for lifting the sticks one at a time above the closed end of the chute to discharge them therefrom, means at the discharge end of the chute for permitting the sticks as discharged from the chute to drop away therefrom by gravity, means for spacing the sticks after leaving the chute, means for causing the sticks to roll along progressively in the spaced relation, means for presenting wrappers to the sticks for inclosing the sticks in the wrappers by the progressive rolling of the sticks, and means for twisting the wrappers beyond the ends of the sticks to hold the wrappers on said sticks.

3. In a machine for wrapping stick candy and other like articles, continuously progressing means for propelling the candy sticks through the machine, a feed chute for directing the candy sticks toward the propelling means, elevating means for the candy sticks for lifting them out of the chute, and means for causing elevated sticks to gravitate to the propelling means.

4. In a machine for wrapping stick candy and other like articles, means for propelling the candy sticks through the machine, a feed chute, lifting devices for the candy sticks for elevating them from the chute, means for directing the candy sticks from the elevated position to the propelling means, and elastic retaining means for the sticks in operative relation to the last-named means to temporarily retain the sticks thereon.

5. In a machine for wrapping stick candy and other like articles, candy stick propelling means, a chute for directing the candy sticks toward the propelling means, a lifting device for elevating the candy sticks from the chute, means for directing the elevated candy sticks to the propelling means, elastic retaining means for temporarily holding the candy sticks in their travel from the chute to the propelling means, and supplemental elastic retaining means for the candy sticks spaced from the first retaining means in the direction of travel of the sticks.

6. In a machine for wrapping stick candy and other like articles, means for propelling the candy sticks through the machine, a feed chute for supplying the candy sticks to the propelling means, means for lifting the candy sticks from the feed chute, means for directing the candy sticks after being elevated to the propelling means, elastic retaining means associated with the directing means and having a normal constraint theretoward for temporarily holding the candy sticks against movement along the directing means, and other temporary elastic retaining means for the sticks located beyond the first-named retaining means in the direction of travel of the sticks, and having a normal constraint in a direction opposite to that of the first-named elastic retaining means.

7. In a machine for wrapping stick candy and other like articles, a feed chute, a reciprocable slide movable in an up and down direction across the discharge end of the feed chute to lift the candy sticks therefrom, and locking means for holding the slide in the depressed position.

8. In a machine for wrapping stick candy and other like articles, a feed chute, a reciprocable slide movable across the discharge end of the feed chute in an up and down direction to lift the candy sticks from the chute, elastic means imparting to the slide a normal tendency toward the high position, means for lowering the slide in opposition to its normal tendency, and a lock for the slide for holding it in the lower position against its normal tendency.

9. In a machine for wrapping stick candy and other like articles, a feed chute, a reciprocable slide movable across the discharge end of the feed chute in an up and down direction to lift the candy sticks from the chute, elastic means imparting to the slide a normal tendency toward the high position, means for lowering the slide in opposition to its normal tendency, and a lock for the slide for holding it in the lower position against its normal tendency, said lock comprising a slidable pin with one end movable in the direction of movement of the slide to engage and depress the slide and provided with means for holding the pin in the depressed position, said pin being also provided with a manipulating handle and with means constraining it toward an elevated position out of the path of the slide.

10. In a machine for wrapping stick candy and other like articles, means for rolling the candy sticks through the machine along a path perpendicular to the length of the sticks, means for holding an elongated and substantially rectangular wrapper in and diagonal to the path of the stick with one corner of the wrapper more advanced toward the on-coming stick than the rest of the wrapper and in position to be first engaged by the stick, and means for supplying an adhesive pick-up to that portion of the stick first engaging the wrapper and comprising a constant level means for supplying adhesive, a yieldable means at the discharge end of the constant level means in position to be engaged by the rolling stick to cause exudation of the adhesive on to the stick, and a yieldable member in the path of the stick between the means for applying the pick-up and the corner of the wrapper.

11. In a machine for wrapping stick candy and other like articles, means for rolling the candy sticks along a path perpendicular to the length of said sticks, means for holding an elongated and substantially rectangular wrapper in and diagonal to the path of the stick with one corner in position to be first engaged by the stick near one end of the latter, and means for supplying an adhesive pick-up to the stick comprising a reservoir for adhesive with a yieldable outlet in the path of the stick in line with the forward corner of the wrapper, and a yieldable holding means for said forward corner of the wrapper located in the path of the stick between the wrapper and the means for applying the adhesive pick-up.

12. In a machine for wrapping stick candy and other like articles, means for rolling the candy sticks along a path perpendicular to their length, means for holding an elongated and substantially rectangular wrapper in and diagonal to the path of the sticks with one corner of the wrapper directed toward the on-coming stick near one end thereof, and means for supplying an adhesive pick-up to the stick comprising a reservoir for the adhesive, a yieldable outlet member for the reservoir in the path of the stick, and an elastic plate having a cut-out for the yieldable outlet and having a portion between said yieldable outlet and the forward corner of the wrapper in overlying relation to said corner and yieldable to the pressure exerted thereon by the on-coming stick of candy to hold down the wrapper while the stick is rolling over the plate and to release the wrapper when engaged by the adhesive pick-up.

13. In a machine for wrapping stick candy and other like articles, means for holding wrapping sheets in position to be engaged by the sticks, and means for rolling the sticks progressively through the machine along a path perpendicular to the length of the stick, comprising a table having a cover of rubber fabric with closely associated upstanding projections, and belts of like rubber fabric for engaging the sticks and moving them along the covering of the table.

14. In a machine for wrapping stick candy and other like articles, a table having a cover of rubber fabric with upstanding closely associated projections, endless belts of like fabric with the projections directed toward the table and movable thereover in position to cause candy sticks between the belts and table to roll progressively through the machine, and a reservoir for wrapping sheets located with respect to the table and its covering of rubber fabric to be engaged by the candy sticks before reaching the portion of the table having said covering of rubber fabric.

15. In a machine for wrapping stick candy and other like articles, utilizing wrappers of paraffin paper, comprising a table having a cover of rubber fabric with a multitude of separate closely associated upstanding projections, endless belts movable over the table in close relation thereto in position to engage the articles being wrapped and roll them through the machine, and a reservoir for the wrapping sheets in position to supply the wrappers to the sticks prior to reaching the rubber fabric covering of the table.

16. In a machine for wrapping stick candy and other like articles, means for rolling the sticks through the machine in a path perpendicular to the length of the sticks, means for supplying wrappers to the sticks with the ends of the wrappers projecting beyond the corresponding ends of the sticks, and twisting means for the projecting ends of the wrappers comprising laterally yieldable fingers in the path of the sticks with the ends of the fingers first engaging the wrappers curved away from the corresponding ends of the sticks with each curved end shouldered where joining the remainder of the finger.

17. In a machine for wrapping stick candy and other like articles, means for rolling the candy sticks through the machine in a path perpendicular to the length of the sticks, means for supplying wrappers to the sticks, the said wrappers each of a length to have its ends project beyond the corresponding ends of the stick to which it is applied, and twisting fingers for the ends of the wrappers arranged on opposite sides of the machine in the path of the respective ends of the wrapped sticks with one finger in normally closer relation to the longitudinal center line of the machine than the other finger, and both fingers having the ends first engaged by the sticks curved away from said longitudinal center line and shouldered where joining the main portions of the fingers.

18. In a machine for wrapping stick candy and other like articles, means for rolling the candy sticks through the machine, and means for supplying sheets of wrapping material to the sticks, comprising a follower for holding a pile of sheets, parallel arms carrying the follower, means constraining the follower to rise, and a link associated with one of the parallel arms and at an angle thereto to have a different extent of movement from the arm, said link having a latch end in position to engage the arm, and said arm having a notch for receiving the latch end of the link.

In testimony that I claim the foregoing as my own I have hereto affixed my signature in the presence of two witnesses.

WILLIAM GEBHARDT.

Witnesses:
PHILIP F. LARNER,
DAVID R. WAGNER.